(No Model.)
N. POWER.
DIFFERENTIAL PISTON VALVE.
No. 603,922. Patented May 10, 1898.
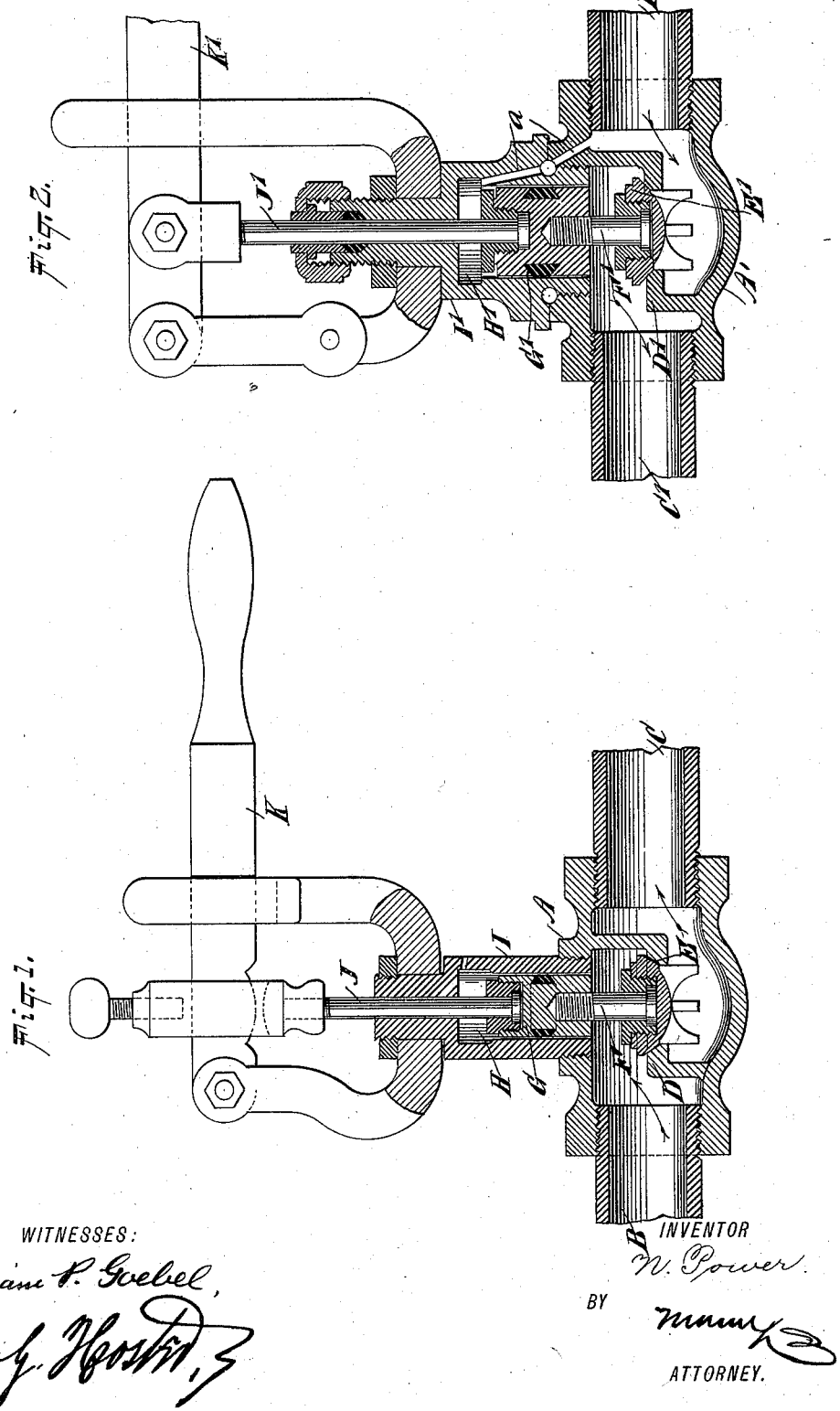
WITNESSES:
William P. Goebel
Theo. G. Hoster
INVENTOR
N. Power.
BY
ATTORNEY.

UNITED STATES PATENT OFFICE.

NICHOLAS POWER, OF NEW YORK, N. Y., ASSIGNOR TO PHILIP BRAENDER, OF WHITE PLAINS, NEW YORK.

DIFFERENTIAL-PISTON VALVE.

SPECIFICATION forming part of Letters Patent No. 603,922, dated May 10, 1898.

Application filed February 21, 1896. Serial No. 580,221. (No model.)

*To all whom it may concern:*

Be it known that I, NICHOLAS POWER, of New York city, in the county and State of New York, have invented a new and Improved Differential-Piston Valve, of which the following is a full, clear, and exact description.

The object of the invention is to provide a new and improved differential-piston valve designed for use as an ejector pump-valve, pressure-regulating valve, balance throttle-valve, &c., and arranged to permit of readily seating and unseating the valve with little force and to hold the valve in either an open or closed position by the pressure of the fluid passing through the valve.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in the figures.

Figure 1 is a sectional side elevation of the improvement arranged as an ejector-valve, and Fig. 2 is a similar view of the same arranged as a throttle-valve.

The valve as illustrated in Fig. 1 is provided with a valve-body A, having an inlet B, an outlet C, and a valve-seat D, on which is adapted to be seated a valve E, mounted to turn on the lower end of a stem F, adjustably secured in a piston G, mounted to slide in a cylinder H, formed in a cap I, secured to the valve-body A. The piston G is held on a head arranged on the lower end of a stem J, fitted to slide in a suitable bearing in the cap I, and connected with a lever K under control of the operator to permit of opening and closing the valve, as the case may be.

Now it will be seen that when the valve is seated on the seat D, as illustrated in the drawings, the pressure of the live fluid passing into the valve-body by the inlet B holds the valve firmly to its seat, as the area of the top of the valve is slightly in excess of that of the under side of the piston G, on which the live fluid presses. Now when it is desired to open the valve E the operator moves the lever K upward, and as said valve is nearly counterbalanced by the pressure of the fluid on the under side of the piston it is evident that but little force is required to raise the valve off its seat. The moment the valve is raised off its seat the pressure of the fluid on the valve is equal on both faces, and consequently the pressure of the fluid on the piston causes the latter to slide upward in the cylinder H to bring the valve into a fully open position and to hold it in this position until the operator desires to close the valve. Now in order to accomplish the latter the operator presses the lever K downward, and the moment the valve D nears the seat then the pressure on the under side of the valve is reduced, and consequently the pressure on the top of the valve causes a firm seating of the valve on its seat, as the pressure on the larger area of the top of the valve is in excess of that on the under side of the piston.

In the device shown in Fig. 2 the valve-body A' is provided with an inlet B', leading to the under side of the valve-seat D', adapted to receive a valve E', connected by a stem F' with a piston G', operating in the cylinder H' of a cap I'. The piston G' is connected by the stem J' with a lever K', which latter serves for opening and closing the valve in the manner above described in reference to Fig. 1. A port $a$ connects the inlet B' with the top of the cylinder H', so that the live fluid at the inlet can pass into the upper end of the cylinder H' to press on the top of the piston G' and hold the valve E' to its seat D', it being understood that the lower end of the piston G' opens into the outlet C' instead of to the inlet B, as shown in Fig. 1.

The area of the under side of the valve E' is somewhat less than the area of the top of the piston G', so that the pressure of the fluid on the top of the piston securely holds the valve E' to its seat; but when the operator lifts the lever K' and moves the valve E' from its seat then the pressure on the piston G' is counterbalanced, as the live fluid in passing into the outlet C' acts on the under side of the valve E, which under side is in area slightly in excess of that of the top of the piston, so that the valve is held in an open position by the pressure of the fluid passing through the valve.

The pistons G G' are provided with suitable packing-rings to prevent leakage of fluid past the piston and the piston-valves are mounted on their stems, so as to insure a proper movement of the pistons in the cylinders and a proper seating of the valves on their seats.

It will be seen that the device is very simple and durable in construction, not liable to get out of order, and can be readily taken apart at any time for inspection or repairs.

Having thus fully described my invention, I claim as new and desire to secure by Letters Patent—

1. A valve, comprising a valve-body having an inlet and outlet and provided with a valve-seat, a cylinder secured to the valve-body above the valve-seat and having its lower open end in communication with the inlet of the body, a piston in the cylinder and provided with a loosely-sliding stem by which it is operated and with a stem projecting from its lower end, and a valve loosely mounted on the stem projecting from the lower end of the piston and adapted to rest upon the valve-seat, the area of the top of the valve being greater than that of the piston, whereby the valve is held to its seat and when raised from its seat, the pressure of the fluid on the lower end of the piston will cause it to slide upward to wholly open the valve and hold it open, as set forth.

2. In a valve, the combination with a valve-body having an inlet and outlet and provided with a valve-seat, and a cylinder secured to the body above the valve-seat and in communication with the inlet of the body, of a piston in the cylinder, a stem adjustably secured to the lower end of the piston, a valve mounted to turn on the lower end of the stem and adapted to rest upon the valve-seat, a stem secured to the upper end of the piston and freely sliding in the cap of the cylinder, and an operating-lever to which the last-named stem is secured, areas of faces of the valve and piston being so proportioned that the valve will be normally held to its seat and that on slightly lifting the valve, the fluid-pressure will entirely open the valve and hold it open, substantially as herein shown and described.

NICHOLAS POWER.

Witnesses:
THEO. G. HOSTER,
JNO. M. RITTER.